United States Patent [19]
Gibbon

[11] Patent Number: 4,737,324
[45] Date of Patent: Apr. 12, 1988

[54] METHOD OF FORMING SPARK PLUG BOOTS WITH RADIATION CURE

[75] Inventor: Robert M. Gibbon, Ft. Worth, Tex.

[73] Assignee: JMK International, Inc., Fort Worth, Tex.

[21] Appl. No.: 928,103

[22] Filed: Nov. 7, 1986

[51] Int. Cl.⁴ .................. B29C 35/08; B29C 65/14
[52] U.S. Cl. ........................................ 264/22; 29/447;
    29/517; 29/856; 264/150; 264/230; 264/236;
    264/343; 264/347; 439/125; 439/932
[58] Field of Search .............. 264/22, 25, 236, 26,
    264/343, DIG. 45, DIG. 46, 150, 230;
    425/174.8 R, 174.8 E, 174.4; 29/447, 517, 856;
    439/126, 125, 932

[56] References Cited

U.S. PATENT DOCUMENTS

| | | | |
|---|---|---|---|
| 2,080,948 | 5/1937 | Mazoyer et al. | 264/347 |
| 2,709,161 | 5/1955 | Kilbourne et al. | 264/236 |
| 2,763,609 | 9/1956 | Lewis et al. | 264/22 |
| 3,396,460 | 8/1968 | Wetmore | 264/230 |
| 3,448,182 | 6/1969 | Derbyshire et al. | 264/230 |

FOREIGN PATENT DOCUMENTS 55-148143  11/1980  Japan ..................... 264/22

Primary Examiner—Jeffery Thurlow
Attorney, Agent, or Firm—James E. Bradley; Charles D. Gunter, Jr.

[57] ABSTRACT

A method is shown for forming a spark plug boot having at least one internal shoulder. An outer tube is first formed of an elastomeric material having an internal bore and a selected length. An inner tube, also formed of an elastomeric material, is inserted within the bore of the outer tube. The inner tube has an external diameter selected to allow it to be slideably received within the bore of the outer tube and has a length which is less than the length of the outer tube. The inner and outer tubes thus assembled are then exposed to electromagnetic radiation for a time sufficient to bond the external diameter of the inner tube to the internal bore of the outer tube.

8 Claims, 1 Drawing Sheet

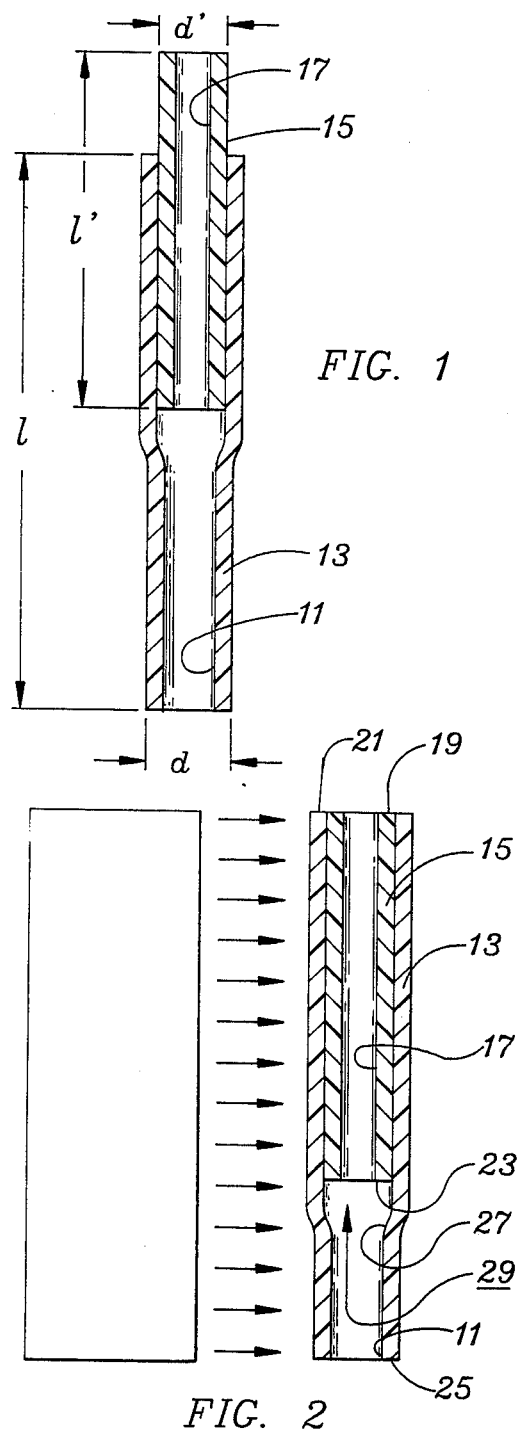
FIG. 1
FIG. 2
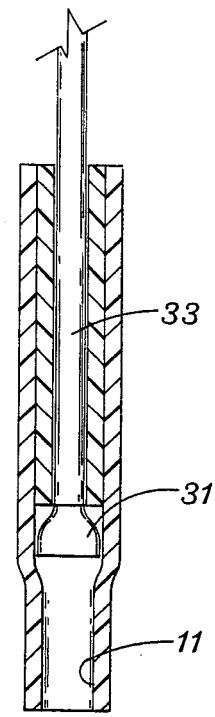
FIG. 3

METHOD OF FORMING SPARK PLUG BOOTS WITH RADIATION CURE

BACKGROUND OF THE INVENTION

1. Field of the Invention.

This invention relates in general to forming elastomeric tubular articles, and in particular to a method of forming spark plug boots utilizing a radiation cure process.

2. Description of the Prior Art.

A spark plug boot is an elastomeric tubular member that slides over a spark plug of an internal combustion engine to serve as an insulator. One end of the boot slides over the spark plug wire, while the other end of the boot slides over the spark plug. There is at least one internal shoulder within the boot, and at least two internal diameters. The majority of the boots are made from silicone rubber but some are made from organic materials.

Spark plug boots are normally made by injection molding. Rubber material is loaded into an injection molding press, which injects the material into the cavity of a mold and heats to cure. The boots thus formed are stripped from the mold and subsequently frozen by nitrogen to make the boots very hard. The frozen boots are tumbled to remove flashing and scrap. After warming to room temperature, the boots will soften to the desired hardness. While this process results in high quality boots, the injection molding, freezing and tumbling steps are expensive.

SUMMARY OF THE INVENTION

In this invention, spark plug boots are formed having at least one internal shoulder. An outer tube is formed of an elastomeric material, the outer tube having an internal bore of a selected internal diameter and having a selected length. An inner tube is formed of an elastomeric material having an internal bore and an external diameter and havng a selected length which is less than the length of the outer tube. The external diameter of the inner tube is selected to allow the inner tube to be slideably received within the bore of the outer tube. A spark plug boot is assembled by sliding the inner tube into the internal bore of the outer tube and by then exposing the assembled boot to electromagnetic radiation for a time sufficient to bond the external diameter of the inner tube to the internal bore of the outer tube.

Additional objects, features and advantages will be apparent in the written description which follows.

BRIEF DESCRIPTION OF THE DRAWINGS

FIG. 1 is a sectional view illustrating the inner tube being inserted within the bore of the outer tube.

FIG. 2 is a schematic illustration of the radiation cure of the inner and outer tubes of FIG. 1.

FIG. 3 is a partial, sectional view of an assembled spark plug boot of the invention showing the spark plug wire and clip in place within the boot.

DETAILED DESCRIPTION OF THE INVENTION

In the method of the invention, an outer tube of an elastomeric material is first formed having an internal bore 11 of a constant internal diameter and having a selected length "l". The vulcanizable elastomeric composition used in forming the outer tube 13 can include those curable materials which are capable of being formed by the method to the required shape. Silicone rubber compositions are preferred because of their stability at elevated temperatures and resistance to contamination by engine fumes, leakage and the like. A typical composition of the type known in the art will contain about 100 parts polyorganosiloxane gum, about 40 parts filler, from about 0.5 to 2.0 parts catalyst and from about 0 to 10 parts of other enhancement additives. Although silicone rubbers are preferred, other rubber compositions can be utilized depending upon the requirements of the end application such as natural rubber, synthetic polyisoprene, butyl rubber, butadiene rubbers, nitrile rubbers, neoprene rubbers, ethylene rubbers, and the like.

Typical silicone polymers or gums will include dimethyl polyorganosiloxane polymers with optional vinyl groups replacing methyl groups on the polymer chain. The vinyl level will be abut 0 to 5 mole percent with the molecular weight of the polymer typically being above one million.

Typical fillers include fume silica, precipitated silica, ground quartz, calcium carbonate and iron oxide. Other conventional enhancement additives can be present as well, such as heat stabilizers, structure control additives, process aids and pigments.

The following example is intended to be illustrative of the elastomer compositions which can be used to practice the preferred invention:

| | |
|---|---|
| Methyl vinyl polysiloxane polymer with 0.2 M % vinyl content | 48.0 Parts |
| Structure control additive | 2 Parts |
| Fume Silica | 7 Parts |
| Precipitated Silica | 7 Parts |
| Accelerator Vi (Methoxy)3Si | 0.2 Parts |
| Ground Silica | 35.0 Parts |
| 2.4.Dichloro Benzoly Peroxide | 0.8 Parts |

The elastomer compositions can be cured with known heat activated catalysts such as the 2.4.dichloro benzoyl peroxide shown above or dicumyl peroxide, or a combination of the two. Preferably the compositions are fully curred and vulcanized prior to assembly into a spark plug boot. However, it is possible that either or both of the inner tube and the outer tube can be only partially cured to provide the necessary "green strength" for assembly, followed by supplemental curing, as will be described. Preferably, the elastomeric composition has a heat activated vulcanizing agent and is extruded in a conventional extruder with the tube thus formed being fed to a continuous vulcanizer of the type known to those skilled in the art. The continuous vulcanizer can be a liquid medium such as a eutectic salt bath through which the tube is drawn. The salt bath is conventional and contains liquid salt at a temperature from 350° to 450° F. The viscosity of the salt at operating temperatures will be similar to water.

The continuous tube is then preferably passed through a cooling step which uses a water trough with water at ambient temperature. The tube is then pulled through a drying step which dries the water from the continuous tube by means of air jets. From the drying step the continuous tube passes to a cutting step which cuts the tube into lengths approximately the length of the desired spark plug boot.

An inner tube 15 is then formed in identical fashion except that the dimensions vary. The inner tube 15 has an internal bore 17, a length "l'", and an external diameter "d'". The length "l" of the inner tube is less than the length "l" of the outer tube and the external diameter "d'" is selected to allow the inner tube 15 to be slidingly received within the bore of the outer tube 13. Typical dimensions for the inner and outer tubes 15, 13 are as follows:

|  | Outer Tube | Inner Tube |
| --- | --- | --- |
| Outer Diameter | 15 mm | 12 mm |
| Inner Diameter | 10 mm | 7 mm |
| Overall Length | 85 mm | 55 mm |

The inner tube 15 can be inserted within the bore 11 of the outer tube 13 in any convenient manner. For instance, the inner tube 15 can be manually inserted within the bore 11, as shown in FIG. 1. Air pressure swelling of the outer tube 13 can also be effected, followed by the insertion of the inner tube 15. For a discussion of air pressure swelling, the reader is referred to U.S. Pat. No. 4,551,293, entitled "Method of Forming Spark Plug Boots", issued Nov. 5, 1985, and assigned to the assignee of the present invention. In that reference, a carrier for the outer tube 13 is shown with an air source for expanding the internal bore of the outer tube. A preferred method of installing the inner tube 15 within the bore of the outer tube 13 is to lubricate the bore 11 of the outer tube 13 with a solvent such as toluene and then pressing the inner tube 15 inside the bore 11.

FIG. 2 shows the inner tube 15 fully inserted within the outer tube 13. The trailing end 19 of the inner tube 15 is flush with one end 21 of the outer tube 13 and the leading end 23 terminates short of the opposite end 25 of the outer tube 13. The snug fit of the inner tube causes the outer tube 13 to be deformed slightly outwardly at the terminatig region 27. The leading end 23 of the inner tube 15 forms an internal shoulder within the outer tube 13. The internal bore 17 of the inner tube is less than the remaining internal bore 11 of the outer tube 13. The leading end 23 together with region 27 forms a clip receiving recess within the outer tube (generally at 29) for receiving the metal clip 31 (FIG. 3) of a spark plug wire 33 which is inserted within the bore 11.

After insertion of the inner tube 15 within the internal bore of the outer tube 13, the spark plug boot thus assembled is exposed to electromagnetic radiation for a time sufficient to bond the external diameter of the inner tube 15 to the internal bore 11 of the outer tube. Any electromagnetic radiation having a wave length of less than about 3A. can be employed in the method of the invention. Examples of suitable radiation sources are gamma rays and X-rays. The greater the intensity of the radiation, the shorter the exposure time required. Other than affecting bonding time, the source of radiation is not critical to the invention. Where one or both of the inner and outer tubes is only partially cured prior to irradiation, a longer exposure time is required. Gamma radiation, such as that obtained from cobalt 60, is a preferred source and requires exposure on the order of 2 to 5 megarads.

The following example is intended to be illustrative of the invention:

EXAMPLE 1

A silicone rubber composition as described above is extruded through a conventional die and fully cured and vulcanized into an outer tube having an external diameter of 15 mm and an internal diameter of 10 mm.

The same composition is extruded into an inner tube having an external diameter of 14 mm and an internal diameter of 7 mm. The outer tube is cut into lengths of 88 mm and dipped into toluene. The inner tube is cut into lengths of 55 mm. The inner tube is then manually inserted within the bore of the outer tube until the trailing end of the inner tube is flush with the adjacent end of the outer tube. The assembly is then allowed to dry and is irradiated by gamma radiation of approximately 3 megarads. The spark plug boot which is produced can be used with 7 mm ignition cable. The ignition cable can be inserted into the assmbly either before or after irradiation.

An invention has been provided with several advantages. The spark plug boots of the invention are simple in design and economical to manufacture. The process avoids flash and scrap that occurred during injection molding. Also, the tubes do not have to be frozen, tumbled and hand inspected as in the prior art. All of these factors make the manufacturing process less expensive.

While the invention has been shown in only one of its forms, it is not thus limited but is susceptible to various changes and modification without departing from the scope thereof.

I claim:

1. A method of forming a spark plug boot with at least one internal shoulder, comprising the steps of:
    extruding an outer tubular member of an uncured elastomeric material, the outer tubular member having a uniform, internal bore of a selected internal diameter;
    at least partially curing the outer tubular member to increase the hardness of the tube sufficiently to enable it to be cut and handled;
    cutting the outer tubular member into individual outer tubes;
    forming an inner tube of an elastomeric material, the inner tube having an internal bore and an external diameter and having a selected length which is less than the length of the outer tube, the external diameter being selected to allow the inner tube to be slideably received within the bore of the outer tube;
    at least partially curing the inner tube;
    sliding the inner tube into the internal bore of the outer tube to form a tubular elastomeric member; and
    exposing the elastomeric member to electromagnetic radiaion of less than 3 A. in wave length for a time sufficient to bond the external diameter of the inner tube to the internal bore of the outer tube.

2. The method of claim 1, wherein the electromagnetic radiation is gamma radiation in a dosage in the range from 2 to 5 megarads.

3. The method of claim 1, wherein the outer tubes are formed form a polyorganosiloxane compound.

4. The method of claim 1, wherein the outer tubes are exposed to a solvent capable of lubricating and swelling the polyorganosiloxane compound prior to insertion of the inner tubes.

5. A method of forming a spark plug boot with at least one internal shoulder, comprising the steps of:
    forming an outer tubular member of an uncured elastomeric material, the outer tubular member having a uniform, internal bore of a selected internal diameter;

at least partially curing the outer tubular member to increase the hardness of the tube sufficiently to enable it to be cut and handled;

cutting the outer tubular member into individual outer tubes;

forming an inner tube of an elastomeric material, the inner tube having an internal bore and an external diameter and having a selected length which is less than the length of the outer tube, the length being defined by a leading end and a trailing end of the inner tube, the external diameter of the inner tube being selected to allow the inner tube to be slideably received within the bore of the outer tube;

at least partially curing the inner tube;

forming a spark plug boot by sliding the inner tube into the internal bore of the outer tube so that the trailing end of the inner tube is flush with an end of the outer tube, the leading end of the inner tube being located within the internal bore of the outer tube to form an internal shoulder; and exposing the spark plug boot to electromagnetic radiation of less than 3 A. in wave length for a time sufficient to bond the external diameter of the inner tube to the internal bore of the outer tube.

6. The method of forming a spark plug boot of claim 5, wherein the trailing end of the inner tube causes the outer tube to be expanded slightly outwardly which, together with the internal shoulder, forms a clip receiving recess in the internal bore of the outer tube and wherein a spark plug wire having a clip thereon is inserted into the internal bore with the clip being contained within the clip receiving recess.

7. The method of claim 6, wherein the spark plug wire and clip are inserted after the spark plug boot is exposed to radiation.

8. The method of claim 6, wherein the spark plug wire and clip are inserted prior to exposing the spark plug boot to radiation.

* * * * *